(12) United States Patent
Coda et al.

(10) Patent No.: US 9,064,668 B2
(45) Date of Patent: Jun. 23, 2015

(54) NON-EVAPORABLE GETTER ALLOYS REACTIVABLE AFTER EXPOSURE TO REACTIVE GASES

(71) Applicant: SAES GETTERS S.P.A., Lainate (IT)

(72) Inventors: Alberto Coda, Gerenzano (IT); Alessandro Gallitognotta, Origgio (IT); Andrea Conte, Milan (IT)

(73) Assignee: SAES GETTERS S.P.A., Lainate (IT)

( * ) Notice: Subject to any disclaimer, the term of this patent is extended or adjusted under 35 U.S.C. 154(b) by 0 days.

(21) Appl. No.: 14/383,289

(22) PCT Filed: Nov. 29, 2013

(86) PCT No.: PCT/IB2013/060511
§ 371 (c)(1),
(2) Date: Sep. 5, 2014

(87) PCT Pub. No.: WO2014/091355
PCT Pub. Date: Jun. 19, 2014

(65) Prior Publication Data
US 2015/0021515 A1    Jan. 22, 2015

(30) Foreign Application Priority Data

Dec. 10, 2012  (IT) .............................. MI2012A2092

(51) Int. Cl.
*H01J 7/18* (2006.01)
*B01J 20/02* (2006.01)
*B01D 53/02* (2006.01)

(52) U.S. Cl.
CPC ........... *H01J 7/183* (2013.01); *H01J 2329/948* (2013.01); *B01D 53/02* (2013.01); *B01D 2253/1122* (2013.01); *B01D 2253/34* (2013.01); *B01D 2257/102* (2013.01); *B01D 2257/108* (2013.01); *B01D 2257/50* (2013.01); *B01J 20/02* (2013.01)

(58) Field of Classification Search
None
See application file for complete search history.

(56) References Cited

U.S. PATENT DOCUMENTS

| 3,203,901 | A | 8/1965 | Porta |
|---|---|---|---|
| 3,926,832 | A | 12/1975 | Barosi |
| 4,071,335 | A | 1/1978 | Barosi |
| 4,312,669 | A | 1/1982 | Boffito et al. |
| 4,440,736 | A | 4/1984 | Maeland et al. |
| 4,668,424 | A | 5/1987 | Sandrock |
| 4,717,551 | A | 1/1988 | Bernauer et al. |
| 4,836,983 | A | 6/1989 | Huang et al. |
| 4,839,085 | A | 6/1989 | Sandrock et al. |
| 5,180,568 | A | 1/1993 | Boffito et al. |
| 5,814,241 | A | 9/1998 | Reutova et al. |
| 5,882,727 | A | 3/1999 | Corazza et al. |
| 5,961,750 | A | 10/1999 | Boffito et al. |
| 5,976,723 | A | 11/1999 | Boffito et al. |
| 6,521,014 | B2 | 2/2003 | Toia et al. |
| 7,393,809 | B2 * | 7/2008 | Kim ................................ 502/326 |
| 7,727,308 | B2 | 6/2010 | Coda et al. |
| 2001/0033965 | A1 * | 10/2001 | Nishimura et al. ......... 429/218.2 |
| 2005/0032637 | A1 * | 2/2005 | Kim ................................ 502/216 |
| 2010/0230299 | A1 * | 9/2010 | Aoki et al. ......................... 206/7 |
| 2011/0121056 | A1 * | 5/2011 | Cheney et al. ................. 228/101 |
| 2011/0272065 | A1 * | 11/2011 | Ohta et al. ..................... 148/540 |

FOREIGN PATENT DOCUMENTS

| EP | 1537250 | 6/2005 |
|---|---|---|
| GB | 2077487 | 12/1981 |
| KR | 100825080 | 4/2008 |
| WO | 2004024965 | 3/2004 |
| WO | 2013054251 | 4/2013 |

OTHER PUBLICATIONS

International Search Report mailed on Mar. 5, 2014 for International Application PCT/IB2013/060511 filed on Nov. 29, 2013 in the name of SAES GETTERS S.P.A.
Written Opinion mailed on Mar. 5, 2014 for International Application PCT/IB2013/060511 filed on Nov. 29, 2013 in the name of SAES GETTERS S.P.A.

* cited by examiner

*Primary Examiner* — Joseph D Anthony
(74) *Attorney, Agent, or Firm* — Steinfl & Bruno LLP

(57) ABSTRACT

Getter materials are described. The getter materials have non-evaporable getter alloys in their powder form having high gas sorption efficiency, particularly for hydrogen, carbon oxide and nitrogen, which after having lost their functionality in consequence of the exposure to reactive gases at a first temperature, can then be reactivated through a thermal treatment at a temperature between 400° C. and 600° C. The alloy powders have as compositional elements titanium and silicon and at least one additional metallic element selected among vanadium, iron and aluminum and have an atomic percentage composition of the elements which can vary within the following ranges: 1. Titanium from 60 to 85 atomic percentage; 2. Silicon from 1 to 20 atomic percentage; and 3. The sum of vanadium, iron and aluminum from 10 to 30 atomic percentage.

9 Claims, No Drawings

NON-EVAPORABLE GETTER ALLOYS REACTIVABLE AFTER EXPOSURE TO REACTIVE GASES

CROSS REFERENCE TO RELATED APPLICATIONS

The present application is the US national stage of International Patent Application PCT/IB2013/060511 filed on Nov. 29, 2013 which, in turn, claims priority to Italian Patent Application MI2012A002092 filed on Dec. 10, 2012.

The present invention is directed to compositions containing non-evaporable getter alloys which, after having lost their functionality as a consequence of an exposure to reactive gases at a first temperature, can then be reactivated by means of a thermal treatment at a second temperature, equal to or higher than the first one.

Non-evaporable getter alloys, also known as NEG alloys, can sorb reversibly hydrogen and irreversibly gases such as oxygen, water vapor, carbon oxides, hydrocarbons and, in the case of some alloys, nitrogen.

These alloys are employed in a number of industrial applications which require the maintenance of vacuum in sealed systems: examples of these applications are particle accelerators, X-ray generating tubes, displays formed of cathode ray tubes or CRTs, flat displays of the field-emission type (called FEDs), evacuated jackets for the thermal insulation such as those used in thermal bottles (thermos), Dewar bottles and pipes for oil extraction and transportation, evacuated jackets of high intensity discharge lamps and vacuum insulated glasses.

NEG alloys can be also employed to remove the above-mentioned gases when traces thereof are present in other gases, generally noble gases or nitrogen. An example is the use in gas-filled lamps, particularly fluorescent lamps which are filled with noble gases at pressures ranging from a few hectoPascal (hPa) to some tens of hectoPascal, wherein the NEG alloy has the function of removing traces of oxygen, water vapor, hydrogen and other gases so as to keep a suitably clean atmosphere for the proper lamp operation. Another example is the use in plasma displays, wherein the function of the NEG alloy is substantially similar to the one carried out in fluorescent lamps, and yet another example is the use of a NEG alloy to remove traces of gaseous impurities for the purification of gases, such as noble gases and nitrogen, employed in the semiconductor field.

These alloys generally have zirconium and/or titanium as main components and comprise one or more additional elements selected among the transition metals, Rare Earths or aluminum.

The functioning principle of NEG alloys is the reaction among the metallic atoms on the alloy surface and the absorbed gases, in consequence of which a layer of oxides, nitrides or carbides of the metals is formed on that surface. When surface coverage is complete, the alloy is inactive for further absorptions: its function can be restored through a reactivation treatment, at a temperature which is at least the same as and preferably higher than the working temperature for a sufficiently long time to have a diffusion of the adsorbed layer into the alloy bulk and to create again a clean and active surface. The activation temperature of a getter alloy is defined as the minimum temperature necessary for the alloy to obtain at least a partially active surface and to start the sorption of active gases within some tens of seconds.

Non-evaporable getter alloys can be classified in two main sub-groups. NEG alloys requiring an activation temperature higher than 450° C. are usually named as "high activation temperature alloys" or simply as "high temperature getter alloys" whereas NEG alloys requiring an activation temperature lower than 450° C. are identified as "low activation temperature alloys" or simply as "low temperature getter alloys". Because of the definition of "activation temperature", low temperature getter alloys can be activated also by using temperatures higher than 450° C.: in these conditions they are characterized by becoming activated in a very short time with respect to that required for high temperature getters alloys. For example, depending on the applied high temperature, they can be activated in a time that is between 3 and 30 times shorter than that for high temperature alloys.

As examples of high temperature getter alloys, U.S. Pat. No. 3,203,901 discloses Zr—Al alloys and U.S. Pat. No. 4,071,335 discloses Zr—Ni alloys.

On the other hand, as examples of low temperature alloys, U.S. Pat. No. 4,312,669 discloses Zr—V—Fe alloys, U.S. Pat. No. 4,668,424 discloses zirconium-nickel-mischmetal alloys with optional addition of one or more other transition metals, U.S. Pat. No. 4,839,085 discloses Zr—V-E alloys, wherein E is an element selected among iron, nickel, manganese and aluminum or a mixture thereof, U.S. Pat. No. 5,180,568 discloses intermetallic compounds Zr-M'-M", wherein M' and M", being identical or different from one another, are selected among Cr, Mn, Fe, Co and Ni, U.S. Pat. No. 5,961,750 discloses Zr—Co—A alloys wherein A is an element selected among yttrium, lanthanum, Rare Earths or a mixture thereof, U.S. Pat. No. 6,521,014 discloses zirconium-vanadium-iron-manganese-mischmetal alloys, and U.S. Pat. No. 7,727,308 discloses Zr—Y-M compositions wherein M is selected among Al, Fe, Cr, Mn, V.

U.S. Pat. No. 4,440,736 discloses vanadium-rich alloys in the Ti—V-M system, wherein M is a metallic element selected among Al, Co, Cr, Cu, Ni, Fe, Mn, Ga, Ge and Si. According to U.S. Pat. No. 4,440,736, a vanadium amount comprised between 32 and 99 atomic percent is necessary in order to stabilize the body-centered cubic phase structure at room temperature. Moreover U.S. Pat. No. 4,440,736 is directed to a different application with respect to gettering (i.e. hydrogen storage and recovery) and it discloses the use of the composition in a bulk form or in a form having a large particle size, i.e. greater than 1 mm.

NEG alloys are used alone or in a mixture with a second component, generally a metal, capable of granting particular characteristics to a body formed with the alloy, such as a higher mechanical strength. The most common mixture with metals are compositions comprising Zr—V—Fe or Zr—Al alloys and zirconium or titanium as described respectively in patents GB 2,077,487 and U.S. Pat. No. 3,926,832, while U.S. Pat. No. 5,976,723 describes compositions containing aluminum and a NEG alloy of formula $Zr_{1-x}$—$Ti_x$-M'-M", wherein M' and M" are metals selected among Cr, Mn, Fe, Co and Ni, and x is comprised between 0 and 1.

One important issue occurring in some cases is that it is impossible to treat an alloy for its activation or reactivation at a temperature higher than that at which it has been previously exposed to gases during the fabrication of devices. It is in particular the case of alloys which are used in devices wherein the space to be kept under vacuum or controlled atmosphere is defined by walls made of glass. The manufacturing of these devices generally requires the getter alloy being inserted in its final position when the device is still open and its inner space is exposed to the atmosphere; thereafter, the device is sealed through a so-called "frit-sealing" step, wherein between two glass portions to be welded together a low-melting glass paste is placed which, in the range of temperature comprised between 400 and 600° C., melts, thus joining the two portions.

The vacuum or the controlled atmosphere can be obtained in the inner space of the device before sealing (in the so-called "in chamber" processes, wherein the device assembling steps are carried out in an enclosure under vacuum or controlled atmosphere) or, more commonly, after the frit-sealing, by means of a "tail", i.e. a small glass tubulation admitting to said space and suitable for connection to a pumping system. In case of devices containing a controlled atmosphere, such as plasma displays and some lamps, the tail is used also for the filling with the desired gases after air removal; finally the device is sealed by closing the tail, usually by hot compression.

In any case, during frit-sealing, the NEG alloy is exposed to an atmosphere of reactive gases, being the gases released by the low-melting glass paste in case of "in chamber" processes, and these same gases plus the atmospheric gases in case of "tail" processes. The contact between the alloy and the reactive gases occurs at a temperature depending on the process: the device can be homogeneously brought to the frit-sealing temperature within a furnace, in which case the NEG alloy will be exposed to the reactive gases at a temperature in the range between 400 and 600° C.; alternatively, it is possible to use a localized heating, e.g. by irradiation, in which case the getter temperature during the operation depends on its distance from the frit-sealing zone. In any case, during these operations the NEG alloy surface reacts with more or less intensity with the gases being present, with consequent at least partial deactivation of the alloy, such that the residual sorption velocity and capacity may result insufficient for the foreseen operation in the device. However a reactivation treatment at a temperature higher than that of frit-sealing is not always possible, to prevent a re-melting of the frit-sealing paste which would endanger the welding seal and to avoid impairment of the mechanical stability of the glassy portions forming the walls of the device containing the getter.

In other cases, such as in most of the discharge lamps manufacturing processes, the getter alloy is inserted in its final position when the device is still in open air and the glass portions are sealed by means of glass melting (the so-called glass sealing); thereafter, the device is evacuated by means of a small glass tubulation present in the structure, after its connection to a pumping system. During the glass sealing process the getter alloy can achieve temperatures in the range of 400-600° C. in the presence of air and of other reactive gases with consequent passivation and deactivation of the alloy.

The European patent published as EP 1537250 describes getter compositions reactivable by treatment at a temperature lower than that of a previous exposure to reactive gases, formed of a mixture of powders of a first component being titanium or a mixture of titanium and at least one of nickel and cobalt, with a second component being a non-evaporable getter alloy comprising zirconium, vanadium, iron, and at least one further component chosen between manganese and one or more elements selected among yttrium, lanthanum and Rare Earths. Even if those mixtures have been found to be completely reactivable in terms of carbon monoxide sorption properties, they have shown a limited capability to be reactivated to absorb other gases, as for example hydrogen.

The international patent application published as WO 2013/054251 describes getter compositions containing a mixture of powders of two different components, consisting in at least two non-evaporable getter alloys. The first of said two components consists in a non-evaporable getter alloy having high-activation temperature; the second component consists in a non-evaporable getter alloy having low-activation temperature. The compositions have a limited interaction with the active gases present during the sealing process and then maintain a higher residual capacity to sorb gases. They have shown good performance in the recovery of the sorption properties in a relatively short range of temperature for the frit-sealing process, but the residual capacity is rather limited due to the presence within the mixture of a large amount of high activation temperature non-evaporable getter that cannot contribute to the sorption process at the working temperature.

It is therefore an object of the present invention to provide getter compositions comprising new non-evaporable getter alloys capable of overcoming the disadvantages of the prior art, in particular alloys that do not require their mixing with other metal elements or alloys in order to allow their reactivation in terms of absorption properties by a treatment in vacuum conditions and at temperatures in the range between 400 and 600° C., even if they have been previously exposed to at least one reactive gas during a thermal treatment.

The alloys useful for the getter devices according to the invention can be produced by melting the pure elements, preferably in powder or pieces, in order to obtain the desired atomic ratios. The melting must be carried out in a controlled atmosphere, for example under vacuum or inert gas (argon is preferred), in order to avoid the oxidation of the alloy which is being prepared.

A possible way to use the compositions of the present invention is to make getter devices or elements in the form of pellets obtained by compression, pouring the getter alloy powders into a suitable mould and compressing the same by a suitable punch, with values of pressure applied generally higher than 3000 Kg/cm$^2$. Compression may be followed by a sintering step, wherein the pellet undergoes a thermal treatment at temperatures comprised between about 700 and 1000° C. under vacuum or inert atmosphere. While in the case of mere compression the getter devices have generally the shape of a pellet, when also sintering is carried out, which increases the mechanical resistance of the finished body, also other shapes can be obtained, such as relatively thin tablets.

As an interesting alternative, the getter device comprises powders of the compositions according to the invention supported on a suitable mechanical substrate, generally of metal. The substrate can be a metallic strip or sheet, in which case the powders of the composition can be deposited by cold rolling or screen-printing followed by sintering; cold rolling is a well-known technique in the field of powders metallurgy, whereas the production of deposits of getter material by screen-printing is disclosed in U.S. Pat. No. 5,882,727. The substrate can also be a container of various shapes, provided with at least an open portion through which the composition of the invention can come into contact with the space from which the gaseous impurities have to be removed, such as a short cylinder wherein the mixture of powders is poured and in which thereafter said mixture is compressed by a suitable punch. In case the composition of the invention is introduced in a container, sintering is generally not required. An alternative structure consists in filiform structures created by bending a long and narrow metallic substrate in order to envelope and wrap the powders of the invention with the exception of a longitudinal slit to favor the gas sorption.

In a third aspect, the present invention consists in a sensitive system with a getter device obtained by use of a getter composition containing powders of at least one non-evaporable getter alloy having high gas sorption efficiency, particularly for hydrogen, carbon oxide and nitrogen, characterized in that said alloy powders comprise as compositional elements titanium and silicon and at least one additional metallic element selected among vanadium, iron and aluminum and have an atomic percentage composition of said elements which can vary within the following ranges:
   a. titanium from 60 to 85 at. %;
   b. silicon from 1 to 20 at. %;
   c. the sum of vanadium, iron and aluminum from 10 to 30 at. %.

Examples of sensitive system that can be improved with the present invention are, in a non-limiting list, particle accelerators, X-ray generating tubes, displays formed of cathode ray tubes or CRTs, flat displays of the field-emission type (called FEDs), evacuated jackets for the thermal insulation such as those used in thermal bottles (thermos), Dewar bottles and pipes for oil extraction and transportation, evacuated jackets of high intensity discharge lamps and vacuum insulated glasses or gas filled lamps.

The invention will be further illustrated by the following examples. These non-limiting examples show some embodiments designed to teach those skilled in the art how to practice the invention and to represent the best considered way to carry out the invention itself.

EXAMPLE 1

Polycrystalline ingots were prepared by vacuum induction melting of appropriate mixtures of the high purity constituent elements. The ingot was then ground under argon atmosphere and subsequently sieved to a final powder usually of less than 300 μm in particle size. 150 mg of each alloy listed in table 1 (see below) were pressed in annular containers in order to obtain the samples labeled as sample A, B, C, D, E and F (according to the present invention) and references 1 and 2 (with composition outside the claimed ranges of the present invention). They were primarily compared in their ability to survive or to be reactivated after passivation at 500° C. for a time corresponding to about 1 minute in order to simulate the glass sealing conditions. It is evident that the samples of the compositions according to the invention are able to withstand the passivation process while maintaining the getter functionality whereas commercially available products have shown strong reaction with the reactive atmosphere (St777) or poorly reactivated performances with respect to their original sorption capacity (St101 or St777 mixed to St101). References 1 and 2 have shown poor mechanical properties and it has not been possible to obtain the desired powder dimension.

TABLE 1

| Sample | Ti (at. %) | V (at. %) | Al (at. %) | Fe (at. %) | Si (at. %) | Status after passivation at 500° C. |
|---|---|---|---|---|---|---|
| sample A | 64.6 | 14.8 | 4.9 | — | 15.7 | Reactivable |
| sample B | 66.6 | 19.0 | 6.3 | — | 8.1 | Reactivable |
| sample C | 67.9 | 11.6 | 3.9 | 8.3 | 8.3 | Reactivable |
| sample D | 70.4 | — | — | 26.6 | 3.0 | Reactivable |
| Sample E | 77.5 | 5.4 | 3.9 | 8.3 | 4.9 | Reactivable |
| Sample F | 68.4 | — | — | 18.4 | 13.2 | Reactivable |
| Reference 1 | 56.8 | — | 41.8 | — | 1.4 | Not-workable |
| Reference 2 | 57.0 | — | 31.8 | — | 11.2 | Not-workable |
| St101 | | | | | | Poorly reactivable |
| St777 | | | | | | Burnt |
| St777 + St101 | | | | | | Poorly reactivable |

EXAMPLE 2

The samples were compared in their sorption performance versus hydrogen, carbon monoxide and nitrogen. The sorption data reported in table 2 were obtained for the different getter samples after passivation of the materials at 500° C. for a time corresponding to about 1 minute in order to simulate the glass sealing conditions. They demonstrate the ability of the materials to keep getter functionality even after a thermal treatment with full exposure to active gas species after reactivation at 500° C. for 10 minutes.

TABLE 2

| Sample | $H_2$ sorption rate cc/s | CO capacity cc Torr/g | $N_2$ capacity cc Torr/g |
|---|---|---|---|
| sample A | 1000 | 11.9 | 3.6 |
| sample B | 500 | 6.0 | 1.2 |
| sample C | 1000 | 10.8 | 2.2 |
| sample D | 600 | 5.7 | 0.8 |

The invention claimed is:

1. A getter material comprising powders of at least one non-evaporable getter alloy having high gas sorption efficiency, particularly for hydrogen, carbon oxide and nitrogen, wherein said alloy powders comprise as compositional elements titanium and silicon and at least one additional metallic element selected among vanadium, iron and aluminum and have an atomic percentage composition of said elements which can vary within the following ranges:
   a. titanium from 60% to 85% atomic percentage;
   b. silicon from 1% to 20% atomic percentage;
   c. the sum of vanadium, iron and aluminum from 10% to 30% atomic percentage.

2. The getter material according to claim 1, wherein the non-evaporable getter alloy powders are further characterized by an atomic percentage of vanadium comprised between 5% and 20% with respect to the total alloy composition.

3. The getter material according to claim 2, wherein the non-evaporable getter alloy powders are further characterized in an atomic percentage of vanadium comprised between 10% and 20% and in an atomic percentage of aluminum comprised between 1% and 10% with respect to the total alloy composition.

4. The getter material according to claim 2, wherein the non-evaporable getter alloy powders are further characterized in an atomic percentage of vanadium comprised between 10% and 20% and in an atomic percentage of iron comprised between 1% and 10% with respect to the total alloy composition.

5. The getter material according to claim 1, wherein the non-evaporable getter alloy powders are further characterized by an atomic percentage of iron comprised between 1% and 30% with respect to the total alloy composition.

6. The getter material according to claim 5, wherein the non-evaporable getter alloy powders are further characterized by an atomic percentage of iron comprised between 15% and 30% and in an atomic percentage of titanium comprised between 65% and 80% with respect to the total alloy composition.

7. The getter material according to claim 2, wherein the non-evaporable getter alloy powders are further characterized in an atomic percentage of aluminum comprised between 1% and 5% and in an atomic percentage of iron comprised between 1% and 15% with respect to the total alloy composition.

8. The getter device containing a getter material according to claim 1.

9. A system containing the getter device according to claim 8, said system being selected among particle accelerators, X-ray generating tubes, displays formed of cathode ray tubes or CRTs, flat displays of the field-emission type (called FEDs), evacuated jackets for the thermal insulation such as those used in thermal bottles (thermos), Dewar bottles and pipes for oil extraction and transportation, evacuated jackets of high intensity discharge lamps and vacuum insulated glasses or gas filled lamps.

* * * * *